US011177691B2

(12) United States Patent
Henry et al.

(10) Patent No.: US 11,177,691 B2
(45) Date of Patent: Nov. 16, 2021

(54) WRISTWATCH BAND AND CHARGING SYSTEM

(71) Applicants: Mark J. Henry, Washington, DC (US); Robert R. Apuzzo, Los Angeles, CA (US); Michael Cruz-Herrera, Los Angeles, CA (US)

(72) Inventors: Mark J. Henry, Washington, DC (US); Robert R. Apuzzo, Los Angeles, CA (US); Michael Cruz-Herrera, Los Angeles, CA (US)

(*) Notice: Subject to any disclaimer, the term of this patent is extended or adjusted under 35 U.S.C. 154(b) by 306 days.

(21) Appl. No.: 16/182,214

(22) Filed: Nov. 6, 2018

(65) Prior Publication Data

US 2019/0140479 A1   May 9, 2019

Related U.S. Application Data

(60) Provisional application No. 62/582,089, filed on Nov. 6, 2017.

(51) Int. Cl.
| | |
|---|---|
| *H02J 7/00* | (2006.01) |
| *H02J 50/10* | (2016.01) |
| *G04G 17/06* | (2006.01) |
| *A44C 5/14* | (2006.01) |
| *G04G 19/00* | (2006.01) |
| *H01M 10/056* | (2010.01) |
| *H02J 50/40* | (2016.01) |
| *H01M 4/36* | (2006.01) |

(52) U.S. Cl.
CPC ............... *H02J 50/10* (2016.02); *A44C 5/14* (2013.01); *G04G 17/06* (2013.01); *G04G 19/00* (2013.01); *H01M 4/36* (2013.01); *H01M 10/056* (2013.01); *H02J 7/0045* (2013.01); *H02J 50/40* (2016.02)

(58) Field of Classification Search
CPC ........................................................ H02J 50/10
USPC ........................................................... 320/108
See application file for complete search history.

(56) References Cited

U.S. PATENT DOCUMENTS

| | | | | |
|---|---|---|---|---|
| 8,994,827 | B2 * | 3/2015 | Mistry | G06F 3/017 348/158 |
| 2009/0252311 | A1 * | 10/2009 | Kuiken | G08C 17/00 379/102.02 |
| 2009/0318779 | A1 * | 12/2009 | Tran | A61B 5/026 600/301 |
| 2009/0322513 | A1 * | 12/2009 | Hwang | G08B 25/016 340/539.12 |

(Continued)

*Primary Examiner* — Yalkew Fantu
(74) *Attorney, Agent, or Firm* — Staas & Halsey, LLP (57) ABSTRACT

A wristwatch band for a computerized watch base has a bracelet portion and a connector element. The bracelet portion extends in a length direction at least partially around a wrist of a wearer and has a power supply device to supply power to the computerized watch base. The connector element secures the computerized watch base to the bracelet portion. In the length direction, the bracelet portion may be discontinuous and terminate at first and second clasp ends. First and second clasp sections may be provided respectively at the first and second clasp ends of the bracelet portion, the first and second clasp sections releaseably connecting around the wrist of the wearer. Electrical connectors may be provided in each clasp section such that when the clasp is connected around the wrist of the wearer, an electrical connection is made from the first clasp end to the second clasp end.

13 Claims, 8 Drawing Sheets

(56) References Cited

U.S. PATENT DOCUMENTS

| | | | |
|---|---|---|---|
| 2011/0093296 A1* | 4/2011 | Klink | G16H 10/65 |
| | | | 705/3 |
| 2014/0375246 A1* | 12/2014 | Boysen, III | H02J 7/342 |
| | | | 320/101 |
| 2015/0186092 A1* | 7/2015 | Francis | G06F 3/04883 |
| | | | 345/520 |

* cited by examiner

WRISTWATCH BAND AND CHARGING SYSTEM

This application claims the benefit of U.S. Provisional Patent Application No. 62/582,089, filed on Nov. 6, 2017 in the United States Patent & Trademark Office, the disclosure of which is incorporated herein by reference.

BACKGROUND

Wristwatches have evolved greatly in recent times. Whereas highly complicated mechanical Swiss watches were previously the most sought after timepieces, it is not uncommon for one to see an Apple® Watch, a Fitbit® or a Samsung Gear® watch in a board meeting. The functions available by these computerized watches, also known as "smart watches" keep increasing. People are now subscribing to data/cellular telecommunications plans for their watch.

The computing power of today's watches comes at a cost. Specifically, battery life is limited by the power requirements of a computer processor, a GPS receiver, a Bluetooth link, and a cellular data link, for example. Gone are the days of the self winding watch. Many if not most computer watch (smart) wearers charge their watch at night while they sleep. To ease the charging burden, some manufacturers propose a wireless inductive charger that transfers energy using an electromagnetic field. However, this does not alleviate the need to charge and charge often.

Charging one's watch is not only inconvenient, it also results in some functions being lost. For example, some lower functioning computer watches, such as the Fitbit®, have batteries that last for days. These watches might track your heart rate and your activity, but might not have a GPS receiver, W-Fi or cellular data connectivity. The Fitbit® successfully functions to promote activity, by tracking your walking steps. Time of activity and strenuousness of activity are monitored using MEMS accelerometers and a heart rate monitor.

Obesity and lack of exercise are huge problems that are increasing at a fast rate in the United States. However, it has been found that people often forget to wear their computer watches after charging. This is less of a problem with the lower functioning computer watch. However, with a higher functioning computer watch such as the Apple® Watch that requires frequent charging, the activity-encouraging functions are lost whenever the watch is not worn.

Sometimes highly functioning computer watches need to be charged during the day. All activity, such as steps, during daytime charging is lost and not recorded. Lower functioning computer watches such as the Fitbit® allow the user to compete with friends/family for the amount of activity during the day. If the watch is being charged, no activity is being tracked.

Sleeplessness is a persistent problem in society. It is estimated that 30 to 35% of people experience symptoms of insomnia. The lack of sleep causes fatigue, the inability to concentrate, mood disturbances and weight gain. Some lower functioning watches such as the Fitbit® track your sleep by monitoring your heart rate and movement during the night. Some users of these watches have reported that their insomnia symptoms are reduced when their sleep is monitored; if the watch tells them that they need more sleep, they return to bed until sufficiently rested. Highly functioning computer watches, which need to be charged at night, are unable to provide these benefits.

SUMMARY

In accordance with the foregoing, the inventors have found that there is a need for reducing the frequency with which a highly functioning computer watch needs to be changed.

The inventors propose a wristwatch band for a computerized watch base. The wristwatch band has a bracelet portion and a connector element. The bracelet portion extends in a length direction at least partially around a wrist of a wearer. The bracelet portion has a power supply device to supply power to the computerized watch base. The connector element secures the computerized watch base to the bracelet portion.

According to one potential embodiment, in the length direction, the bracelet portion is discontinuous and terminates at first and second clasp ends. In this case, first and second clasp sections may be provided respectively at the first and second clasp ends of the bracelet portion, the first and second clasp sections releaseably connecting around the wrist of the wearer. Electrical connectors may be provided in each clasp section such that when the clasp is connected around the wrist of the wearer, an electrical connection is made from the first clasp end to the second clasp end.

According to another aspect of the proposal, the bracelet portion extends only partially around the wrist of the wearer, and the connector element includes a pair of band connectors. These band connectors may be provided at each of two ends of the bracelet portion such that the bracelet portion extends in the length direction between the two band connectors. With this aspect, each band connector connects to a mating watch connector of the computerized watch base to secure the computerized watch base to the bracelet portion. With one alternative, the power supply device has a pair of terminals with one terminal being provided in each band connector to electrically connect to a mating terminal in a respective mating watch connector.

The wristwatch band may have a charging circuit to set when power is supplied from the power supply device to the computerized watch base.

The bracelet portion may have opposing inner and outer surfaces, with the inner surface contacting the wrist of the wearer and the outer surface being exposed. The power supply device may include a solar cell exposed at the outer surface of the bracelet portion.

In addition or in the alternative, the power supply device may include a rechargeable battery, perhaps a lithium ion rechargeable battery. Nanodiamonds may be provided in an electrolyte solution of the rechargeable battery.

The bracelet portion may be formed by at least two links separated from one another in a length direction of the bracelet portion. The at least two links may be connected by a biasing member that biases the links towards one another. A battery cell may be provided in each of the at least two links. In this case, an electrical connection can pass electric current between adjacent links. If the links are connected by a biasing member, the biasing member may also serve as the electrical connection.

According to one potential embodiment of the proposal, the bracelet portion has two end and extends only partially around the wrist of the wearer, and the power supply device includes an inductive charging portion. The inductive charging portion connects the two ends of the bracelet portion such that bracelet portion and the inductive charging portion together extend fully around the wrist of the wearer. In this case, the connector element secures the computerized watch base to the wristwatch band at a position so that the inductive charging portion abuts an inductive charge receiving element on the computerized watch base.

The inventors further propose a charging system for a computerized watch base. The charging system includes the wristwatch band and a charger to transfer power to the rechargeable battery of the power supply device.

According to a first alternative for the charging system, the bracelet portion extends only partially around the wrist of the wearer and the connector element includes a pair of band connectors. These band connectors are provided at each of two ends of the bracelet portion such that the bracelet portion extends in the length direction between the two band connectors. Each band connector connects to a mating watch connector of the computerized watch base to secure the computerized watch base to the bracelet portion. The power supply device may have a pair of terminals with one terminal being provided in each band connector to electrically connect to a mating terminal in a respective mating watch connector. With this alternative for the charging system, the charger releasably connects to at least one terminal of the pair of terminals.

According to a second alternative for the charging system, the bracelet portion has two end and extends only partially around a wrist of a wearer, and the wristwatch band further includes an inductive charging portion. The inductive charging portion connects the two ends of the bracelet portion such that bracelet portion and the inductive charging portion together extend fully around a wrist of the wearer. The connector element secures the computerized watch base to the wristwatch band at a position that abuts the inductive charging portion to an inductive charge receiving element on the computerized watch base. With this second alternative for the charging system, the charger is a wireless inductive charger to transfer power to the inductive charging portion of the power supply device. One potential modification for the second alternative for the charging system has the inductive charging portion being at least partially transparent to electromagnetic fields. With this potential modification, the wireless inductive charger can simultaneously transfer power to the inductive charging portion of the power supply device and to the inductive charge receiving element on the computerized watch base when the computerized watch base is secured to the bracelet portion.

BRIEF DESCRIPTION OF THE DRAWINGS

These and other objects and advantages of the present invention will become more apparent and more readily appreciated from the following description of the preferred embodiments, taken in conjunction with the accompanying drawing of which.

DETAILED DESCRIPTION

Reference will now be made in detail to the preferred embodiments of the present invention, examples of which are illustrated in the accompanying drawings, wherein like reference numerals refer to like elements throughout.

Figure 1:
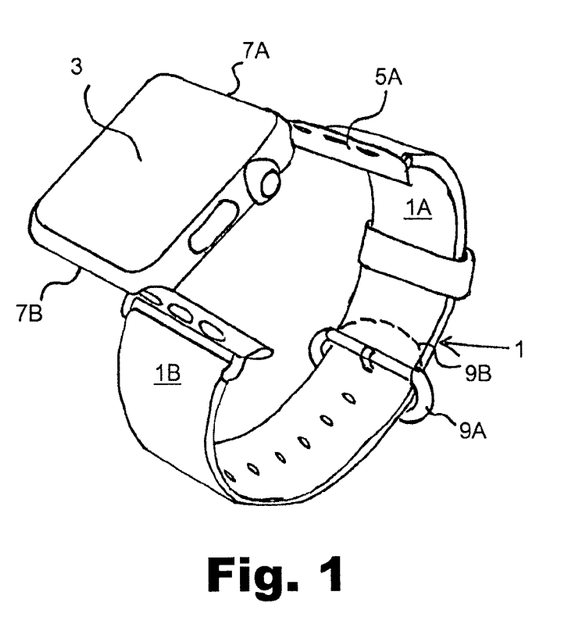
FIG. 1 is a perspective view of a computerized watch base and the wristwatch band according to one embodiment of the present invention.

FIG. 1 is a perspective view of a computerized watch base and the wristwatch band according to one embodiment of the present invention. The wristwatch band has a bracelet portion 1 having an inner surface 1A and an outer surface 1B. The embodiment shown in FIG. 11 has a connector element to secure the bracelet portion 1 to a watch base 3. In this environment, the connector element is formed by first and second band connectors 5A, 5B. These band connectors 5A, 5B are received in a sliding fashion within mating watch connectors 7A, 7B of the watch base 3. To transfer power from a power supply device of the bracelet portion 1 to the watch base 3, a power transfer terminal may be provided in each band connector 5A, 5B and in each mating watch connector 7A, 7B.

The bracelet portion shown in FIG. 1 is discontinuous and terminates at first and second clasp sections 9A, 9B. These clasp sections 98, 9B releasably connect the bracelet portion 1 around the wrist of a wearer. Electrical connectors may be provided in each clasp section such that when the clasp is secured, electrical connection is made through the clasp sections 9A, 9B.

Figure 2:
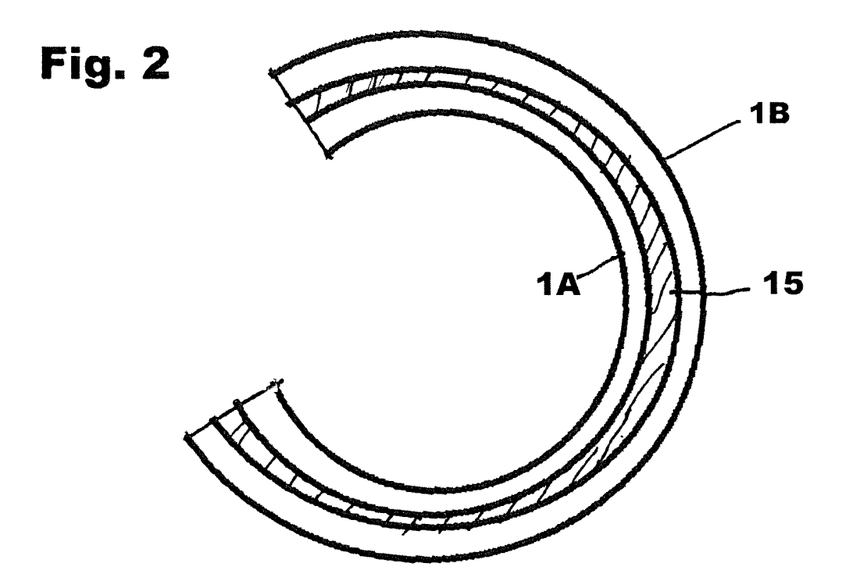
FIG. 2 is a schematic cross-sectional view of the bracelet portion shown in FIG. 1 according to a first embodiment.

FIG. 2 is a schematic cross-sectional view of the bracelet portion shown in FIG. 1 according to a first embodiment. FIG. 2 shows that a battery 15 is incorporated between the inner surface 1A and outer surface 1B of the bracelet portion. The battery 15 may be a rechargeable battery such as a lithium ion battery. The battery 15 is held in a watertight manner between the inner and outer surfaces 1A, 1B of the bracelet portion. For example, if the bracelet portion is made of a polymer material, the battery may be sealed with a polymer sleeve of the bracelet portion.

Short circuiting is a known problem with lithium ion batteries. One possible way the invention can avoid this is to have nanodiamonds in the electrolyte solution for the cells to suppress lithium dendrites reduce the risk of short circuiting. See Nat. Commun. 2017, DOI: 10.1038/S41467-017-00519-2, incorporated herein by reference.

To extend around the wrist of a wearer, a watch band must be bendable. Incorporating a battery into the band must not interfere with the flexibility of the band. There are several ways to maintain flexibility despite the incorporation of one or more batteries. One option is to use a flexible battery cell extending around the band. A battery cell includes a cathode, and anode, a separator and in many cases a current collector. To produce a flexible battery cell, the electrodes (cathode and anode) may be formed using polymer binders and conductive additives. Flexibility can be achieved by introducing nanocarbons into lithium-ion batteries. It is also possible to use $Li_4Ti_5O_{12}$ and $LiFePO_4$ as the anode and cathode materials, respectively and use a graphene based current collector.

Figure 3:
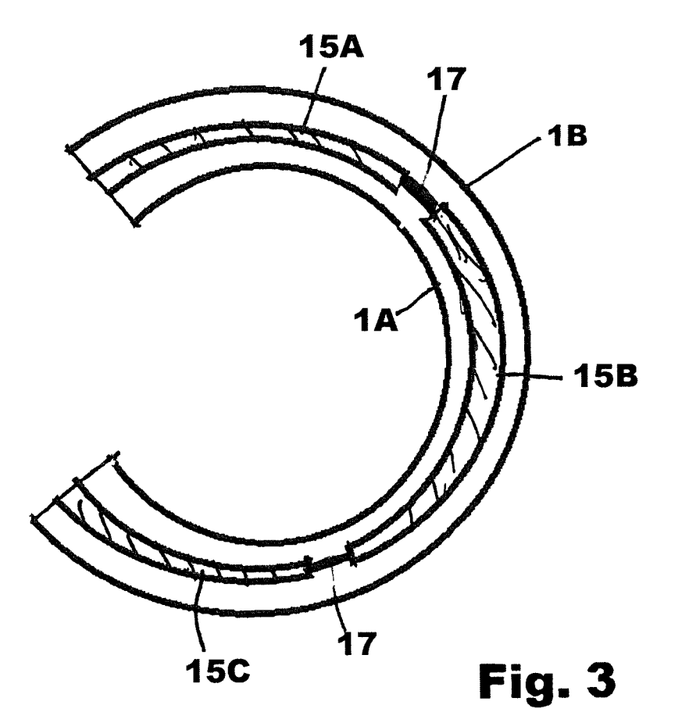
FIG. 3 is a schematic cross-sectional view of the bracelet portion shown in FIG. 1.

In addition, or in the alternative, another option for maintaining watchband flexibility is to use a plurality a battery cells, each of which extends only partially around the watch band. FIG. 3 is a schematic cross-sectional view of the bracelet portion shown in FIG. 1 according to a second embodiment. Whereas FIG. 2 shows a single battery 15, FIG. 3 shows a plurality of battery cells 15A, 15B, 15C provided around the bracelet portion. Adjacent battery cells 15A, 15B, 15C are connected by flexible wiring 17. Each battery cell can either be rigid or flexible. For rigid battery cells, the overall watchband flexibility can be increased by increasing the number of cells distributed over the band. The showing in FIG. 3 of three battery cells 15A, 15B, 15C is in no way limiting.

Figure 4:
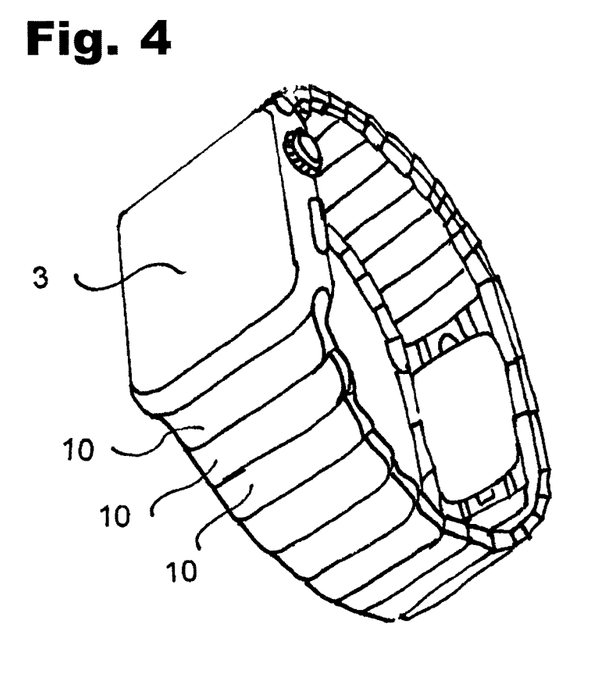
FIG. 4 is a perspective view of a computerized watch base and the wrist watch band, showing and alternative embodiment for the bracelet portion.

FIG. 4 is a perspective view of a computerized watch base and the wrist watch band, showing and alternative embodiment for the bracelet portion. In FIG. 4, the bracelet portion 1 is formed by a plurality of links 10 separated from one another in a length direction of the bracelet portion. A biasing member biases the links towards one another. A battery may be provided in each link. Alternatively, since some of the band may need to be removed in order to size the bracelet portion to the wearer's wrist, battery cells may be provided only in the links 10 that are proximate to the watch base 3. Adjacent battery cells of adjacent links 10 are connected by an electrical connection to pass current between adjacent links. This electrical connection may be provided by the biasing member that biases the links towards one another.

Just as charging batteries is not 100% efficient, discharging batteries is also not 100% efficient. One reason for this is that a battery has an internal resistance. As current is being introduced into the battery or drawn from the battery, the current is being pushed through the internal resistance of the battery. This causes the battery to heat. Batteries heat up only when charged or discharged. The charging and discharging rates and intervals can be controlled to avoid problems in battery overheating. This can be done with a charging circuit provided in the watch band or in a charger for the watch band.

One benefit of incorporating at least one battery into the watch band is that the heat transfer capability of a watch band is much greater than that of a watch body. Batteries held within a watch body mainly dissipate heat only above and below the battery compartment. Below the watch body battery compartment is the wearer's wrist which has an elevated temperature relative to room temperature. Above the watch body battery compartment, watch electronics may be provided, and these watch electronics themselves generate heat. On the other hand, batteries incorporated into a watch band a much greater surface area for heat transfer. Also, the outer surface of a watch band is at a temperature much closer to room temperature than anything in a watch body.

Figure 5:
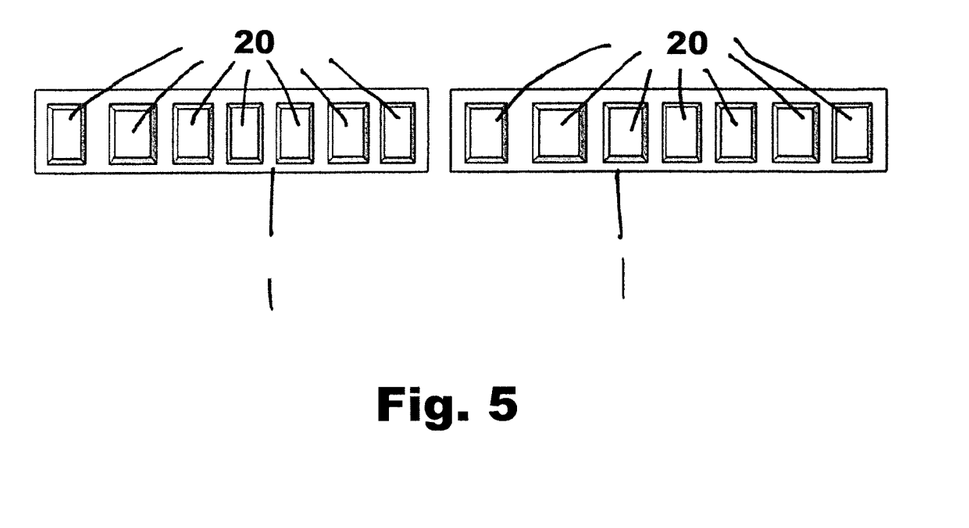
FIG. 5 is a top view of the bracelet portion shown in FIG. 1, showing an alternative embodiment for the power supply device.

FIG. 5 is a top view of the bracelet portion shown in FIG. 1, showing an alternative embodiment for the power supply device. Whereas FIGS. 2 and 3 show the power supply device embodied as one or more rechargeable batteries, the embodiment shown in FIG. 5 has a power supply device formed from a plurality of solar cells 20 provided around the bracelet portion 1. The solar cells 20 need to be exposed to ambient light. Therefore, the top view of FIG. 5 shows the outer surface 1B of the bracelet portion 1.

Figure 6:
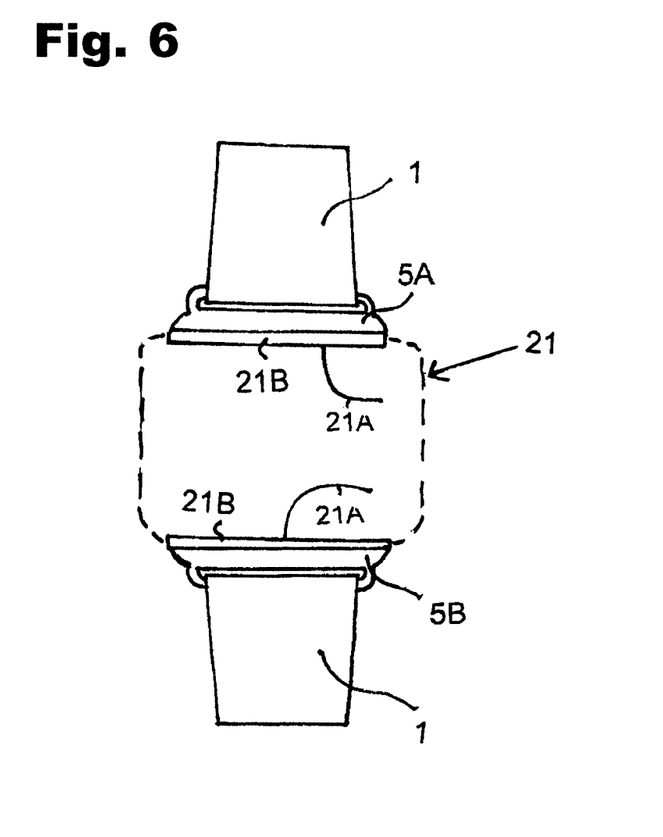
FIG. 6 is a perspective view of a computerized watch base and a wristwatch band, showing a first embodiment for charging rechargeable batteries.

If the power supply device is embodied as a rechargeable battery, this battery must be charged. FIG. 6 is a perspective view of a computerized watch base and a wristwatch band, showing a first embodiment for charging rechargeable batteries. FIG. 6 shows the first and second band connectors 5A, 5B which are received in a sliding fashion by the watch base. FIG. 6 also shows a charging device 21 having a pair of electrical leads 21A. Each electrical lead 21A terminates at an outlet 21B. The securing clasps 21B fit in a mating manor with the band connectors 5A, 5B in a manner similar to how the bracelet portion fits to the watch base. Power is passed from the electrical leads 21A to the rechargeable batteries via the outlets 21B and the band connectors 5A, 5D.

Figure 7:
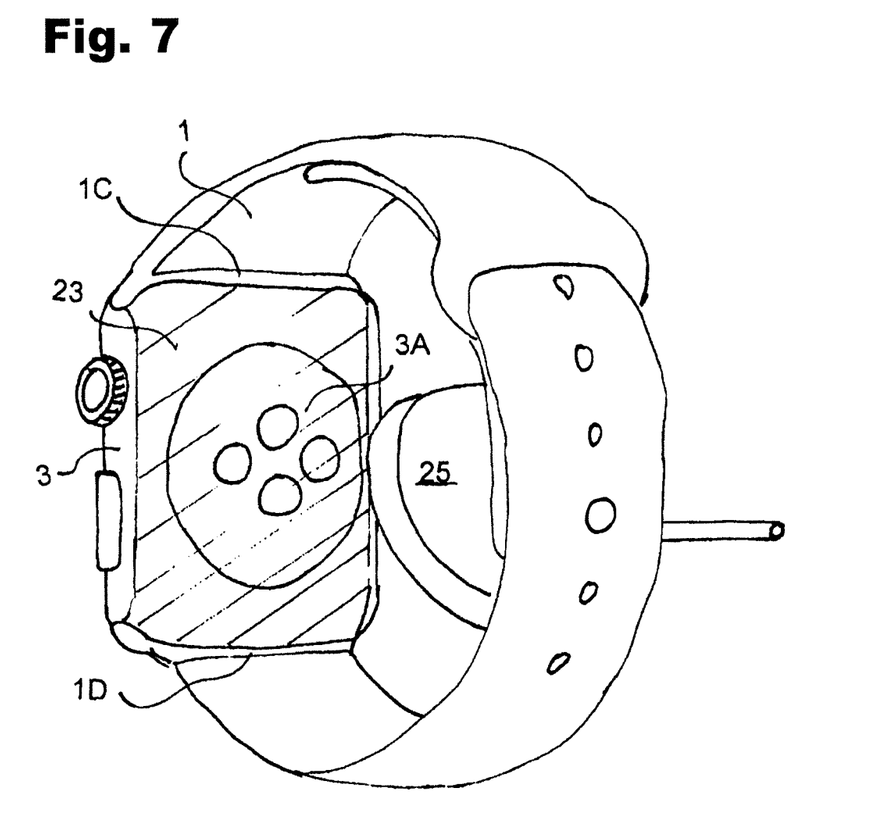
FIG. 7 is a perspective view of a computerized watch base and a wristwatch band, showing it second embodiment for charging rechargeable batteries.
Figure 8:
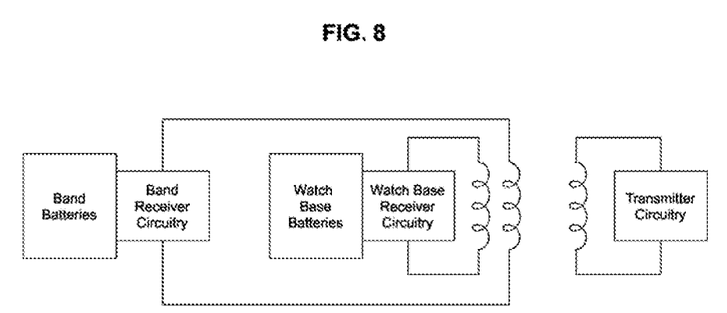
FIG. 8 is a schematic circuit diagram for one possible embodiment of the charger.

FIG. 7 is a perspective view of a computerized Watch base and a wristwatch band, showing it second embodiment for charging rechargeable batteries. In FIG. 7, it is apparent that the bracelet portion has two ends 1C and 1D and extends only partially around the wrist of a wearer. An inductive charging portion 23 connects the two ends 1C, 1D such that the inductive charging portion 23 and the bracelet portion 1 together extend fully around the rest of the wearer. The computerized watch base 3 is secured adjacent to the inductive charging portion 23 so that power from the rechargeable batteries can be passed to the watch base 3 by the inductive charging portion 23. The inductive charging portion 23 may be at least partially transparent to electromagnetic fields. An inductive charger 25 is therefore able to simultaneously transfer power to both the inductive charging portion 23 and to inductive charge receiving elements 3A of the watch bass 3.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

What is claimed is:

1. A wristwatch band for a charger and for a computerized watch base that tells time, comprising:
    a bracelet portion to extend in a length direction at least partially around a wrist of a wearer, the bracelet portion having a power supply device to supply power to the computerized watch base, the power supply device comprising a rechargeable watchband battery, the charger being removably connectable to the bracelet portion and the rechargeable battery, to transfer power to the rechargeable battery of the power supply device; and a connector element to removably secure the computerized watch base to the rechargeable watchband battery and the bracelet portion, wherein
    the connector element provides a removable connection that secures the bracelet portion to the computerized watch base and transfers power from the rechargeable watchband battery to the computerized watch base such that when connected, the bracelet portion and the computerized watch base provide a continuous loop that can extend all the way around the wrist of a wearer, the bracelet portion has two ends and extends only partially around a wrist of a wearer,
    the wristwatch band further comprises an inductive charging portion, the inductive charging portion connecting the two ends of the bracelet portion such that bracelet portion and the inductive charging portion together extend fully around a wrist of the wearer, the connector element securing the computerized watch base to the wristwatch band at a position that abuts the inductive charging portion to an inductive charge receiving element on the computerized watch base, the charger is a wireless inductive charger to transfer power to the inductive charging portion of the power supply device, the inductive charging portion is at least partially transparent to electromagnetic fields, and the wireless inductive charger simultaneously transfers power to the inductive charging portion of the power supply device and to the inductive charge receiving element on the computerized watch base when the computerized watch base is secured to the bracelet portion.

2. The wristwatch band according to claim 1, wherein
in the length direction, the bracelet portion is discontinuous and terminates at first and second clasp ends,
first and second clasp sections are provided respectively at the first and second clasp ends of the bracelet portion, the first and second clasp sections releaseably connecting around the wrist of the wearer, and
electrical connectors are provided in each clasp section such that when the clasp is connected around the wrist of the wearer, an electrical connection is made from the first clasp end to the second clasp end.

3. The wristwatch band according to claim 1, wherein the connector element comprises a pair of band connectors, the band connectors are provided at each of two ends of the bracelet portion such that the bracelet portion extends in the length direction between the two band connectors, and each band connector connects to a mating watch connector of the computerized watch base to secure the computerized watch base to the bracelet portion.

4. The wristwatch band according to claim 3, wherein the power supply device has a pair of terminals with one terminal being provided in each band connector to electrically connect to a mating terminal in a respective mating watch connector.

5. The wristwatch band according to claim 1, further comprising:
a charging circuit to set when power is supplied from the power supply device to the computerized watch base.

6. The wristwatch band according to claim 1, wherein
the bracelet portion has opposing inner and outer surfaces,
the inner surface contacts the wrist of the wearer,
the outer surface is exposed, and
the power supply device comprises a solar cell exposed at the outer surface of the bracelet portion.

7. The wristwatch band according to claim 1, wherein
the rechargeable watchband battery is a lithium ion rechargeable battery, and
nanodiamonds are provided in an electrolyte solution of the rechargeable watchband battery.

8. The wristwatch band according to claim 1, wherein the bracelet portion is formed by at least two links separated from one another in a length direction of the bracelet portion.

9. The wristwatch band according to claim 8, wherein the at least two links are connected by a biasing member that biases the links towards one another.

10. The wristwatch band according to claim 9, wherein the at least two links are further connected by an electrical connection to pass electric current between adjacent links.

11. The wristwatch band according to claim 8, wherein
a battery cell is provided in each of the at least two links, and
the at least two links are connected by an electrical connection to pass electric current between adjacent links.

12. A charging system for a computerized watch base that tells time, comprising: a wristwatch band comprising: a bracelet portion to extend in a length direction at least partially around a wrist of a wearer, the bracelet portion having a power supply device to supply power to the computerized watch base, the power supply device comprising a rechargeable battery; and
a connector element to removably secure the computerized watch base to the rechargeable watchband battery and the bracelet portion; and a charger removably connectable to the bracelet portion and the rechargeable battery, to transfer power to the rechargeable battery of the power supply device, wherein
the connector element provides a removable connection that secures the bracelet portion to the computerized watch base and transfers power from the rechargeable watchband battery to the computerized watch base such that when connected, the bracelet portion and the computerized watch base provide a continuous loop that can extend all the way around the wrist of a wearer,
the bracelet portion has two ends and extends only partially around a wrist of a wearer, the wristwatch band further comprises an inductive charging portion, the inductive charging portion connecting the two ends of the bracelet portion such that bracelet portion and the inductive charging portion together extend fully around a wrist of the wearer,
the connector element securing the computerized watch base to the wristwatch band at a position that abuts the inductive charging portion to an inductive charge receiving element on the computerized watch base, the charger is a wireless inductive charger to transfer power to the inductive charging portion of the power supply device,
the inductive charging portion is at least partially transparent to electromagnetic fields, the wireless inductive charger simultaneously transfers power to the inductive charging portion of the power supply device and to the inductive charge receiving element on the computerized watch base when the computerized watch base is secured to the bracelet portion.

13. The charging system according to claim 12, wherein the connector element comprises a pair of band connectors, the band connectors are provided at each of two ends of the bracelet portion such that the bracelet portion extends in the length direction between the two band connectors, and each band connector connects to a mating watch connector of the computerized watch base to secure the computerized watch base to the bracelet portion.

* * * * *